(12) United States Patent
Zhou

(10) Patent No.: US 10,838,252 B2
(45) Date of Patent: Nov. 17, 2020

(54) LIGHT AND THIN DISPLAY DEVICE

(71) Applicant: Huizhou China Star Optoelectronics Technology Co., Ltd., Guangdong (CN)

(72) Inventor: Mingjun Zhou, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 306 days.

(21) Appl. No.: 15/751,116

(22) PCT Filed: Jan. 18, 2018

(86) PCT No.: PCT/CN2018/073171
§ 371 (c)(1),
(2) Date: Feb. 7, 2018

(87) PCT Pub. No.: WO2019/127730
PCT Pub. Date: Jul. 4, 2019

(65) Prior Publication Data
US 2020/0089053 A1      Mar. 19, 2020

(30) Foreign Application Priority Data
Dec. 29, 2017 (CN) .......................... 2017 1 1484516

(51) Int. Cl.
G02F 1/13357 (2006.01)
G02F 1/1333 (2006.01)

(52) U.S. Cl.
CPC .. G02F 1/133602 (2013.01); G02F 1/133385 (2013.01)

(58) Field of Classification Search
CPC ..................... G02F 1/133602; G02F 1/133385
(Continued)

(56) References Cited

U.S. PATENT DOCUMENTS

2013/0278861 A1* 10/2013 Hsiao .................... F21V 29/006
349/61

FOREIGN PATENT DOCUMENTS

CN      101881399 A      11/2010
CN      102620214 A      8/2012
(Continued)

*Primary Examiner* — Nathanael R Briggs
*Assistant Examiner* — William D Peterson
(74) *Attorney, Agent, or Firm* — Hemisphere Law, PLLC; Zhigang Ma

(57) ABSTRACT

A light and thin display device is provided. The light and thin display device includes: an LED light bar disposed at a light-incident end of a light guide plate and attached to an inner side of a heat dissipation plate; a base connected with an outer side of the heat dissipation plate; a water cooling pipe including an inlet port, an outlet port, and multiple bending segments connected between the inlet port and the outlet port. The bending segments are attached to the heat dissipation plate for circulating coolant liquid. By making full use of the heat dissipation capacity of the heat dissipation plate and the heat conduction base, the area of the heat dissipation plate is reduced and heat dissipation fins are avoided. The display device is ensured light and thin and has a good heat dissipation effect. The cost of the heat dissipation structure is reduced.

18 Claims, 3 Drawing Sheets

(58) Field of Classification Search
USPC .......................................................... 349/62
See application file for complete search history.

(56) References Cited

FOREIGN PATENT DOCUMENTS

| CN | 102749741 A |   | 10/2012 |
|----|-------------|---|---------|
| CN | 106647019 A |   | 5/2017  |
| CN | 107257609 A | * | 10/2017 |
| CN | 107257609 A |   | 10/2017 |
| JP | 2006-310044 A |   | 11/2006 |

* cited by examiner

LIGHT AND THIN DISPLAY DEVICE

RELATED APPLICATIONS

The present application is a National Phase of International Application Number PCT/CN2018/073171, filed on Jan. 18, 2018, and claims the priority of China Application No. 201711484516.8, filed on Dec. 29, 2017.

FIELD OF THE DISCLOSURE

The disclosure relates to a technical field of screen display, and more particularly to a light and thin display device.

BACKGROUND

Since liquid crystal itself does not emit light, the backlight module can be described as a key component of liquid crystal display (LCD) panels. The main function of the backlight module is to supply a light source with sufficient brightness and uniform distribution so that the LCD panels can display images normally. As LCD panels are already widely used in a wide range of electronic devices with growth potential, such as monitors, notebooks, digital cameras, projectors, etc., the demand for backlight modules and their associated components continues to grow. In general, the backlight module can be divided into two designs, which are direct-type and edge-type backlight modules, according to the location of the light source. In the direct-type backlight module, the light source is directly under the display panel. In the edge-type backlight module, the light source is near the side edge of the display panel. Since the edge-type backlight module provides the light source generator on the side edge of the display panel, the volume and manufacturing cost of the liquid crystal display can be reduced. The liquid crystal display can be applied to small-sized electrical products.

The main heat dissipation method of the existing backlight modules is to conduct the heat onto the backplane. The heat is dissipated to the environment through the surface area of the backplane itself, which is in contact with the outside environment. However, the above surface area is usually limited by the size of the display panel of the backlight module, and it affects its heat dissipation efficiency. As a result, the light source overheats due to poor heat dissipation of the backlight module. Accordingly, the lifetime of the backlight module is shortened and its light-emitting efficiency is reduced. In order to improve the heat dissipation efficiency, some manufacturers also manufacture a large number of heat dissipation fins on the back of the backplane of the display device to dissipate heat. The heat dissipation efficiency is obviously improved by adding the heat dissipation fins. However, this directly causes that the display device has a greater thickness and the overall seems very unwieldy. It does not meet the current trend of a light and thin television.

SUMMARY

In view of the shortcomings of the prior art, the disclosure provides a thin and light display device, so that the heat dissipation effect of the display device can be ensured under the premise of being light and thin.

In order to achieve the above objective, the disclosure adopts the following technical solutions:

A light and thin display device, comprising:

a light guide plate for guiding light;

a light-emitting diode (LED) light bar disposed at a light-incident end of the light guide plate for emitting light toward the light guide plate;

a heat dissipation plate disposed beside the LED light bar, which is attached to an inner side of the heat dissipation plate;

a base connected with an outer side of the heat dissipation plate for supporting the display device; and a water cooling pipe comprising an inlet port, an outlet port, and multiple bending segments connected between the inlet port and the outlet port. The bending segments are attached to the heat dissipation plate for circulating coolant liquid. The coolant liquid flows into the inlet port and then flows out of the outlet port to take away heat on the heat dissipation plate.

As one of the embodiments, the heat dissipation plate is an L-shaped aluminum extrusion and comprises a transverse plate and a longitudinal plate, which are bent with each other. The LED light bar is attached to an inner surface of the transverse plate, and the longitudinal plate is disposed opposite to a back surface of the light guide plate.

As one of the embodiments, the base comprises a bottom plate and a supporting plate which are disposed at an angle. The supporting plate is attached to a surface of the longitudinal plate facing away from the light guide plate.

As one of the embodiments, the water cooling pipe is attached to an outer surface of the transverse plate.

Alternatively, the transverse plate comprises a first curved groove disposed therein. The inlet port and the outlet port of the water cooling pipe are separately inserted into two ends of the first curved groove.

As one of the embodiments, the light and thin display device further comprises a water pump and a conduit connected to each other. The water pump is used for supplying power to the coolant liquid. The conduit comprises a liquid inlet pipe connected to the inlet port and a liquid outlet pipe connected to the outlet port. The liquid inlet pipe and the liquid outlet pipe separately extend to be in contact with a surface of the bottom plate.

As one of the embodiments, the bottom plate comprises a heat dissipation channel disposed therein. The heat dissipation channel is tortuously arranged and simultaneously connected to the liquid inlet pipe and the liquid outlet pipe.

As one of the embodiments, the heat dissipation channel comprises multiple second curved grooves and linking pipes. The second curved grooves are disposed in the bottom plate and disconnected to each other. The linking pipes are disposed outside of the bottom plate and separately connect each two adjacent second curved grooves.

As one of the embodiments, the liquid inlet pipe and the liquid outlet pipe separately extend from a middle portion of the bottom plate to two ends of the bottom plate and are connected to the heat dissipation channel.

Alternatively, the liquid inlet pipe and the liquid outlet pipe are disposed to penetrate the supporting plate.

The disclosure provides a novel heat dissipation structure of a display device. By making full use of the heat dissipation capacity of the heat dissipation plate and the heat conduction base, the area of the heat dissipation plate is reduced and heat dissipation fins are avoided. Under the premise of ensuring the lightness and thinness of the display device, the display device has a good heat dissipation effect. The cost of the heat dissipation structure is reduced.

DETAILED DESCRIPTION OF THE PREFERRED EMBODIMENTS

In order to make the objectives, technical solutions and advantages of the disclosure more comprehensible, the disclosure is further described in detail below with reference to the accompanying drawings and embodiments. It should be understood that the specific embodiments described herein are merely used to explain the disclosure, and are not intended to limit the disclosure.

Figure 1:
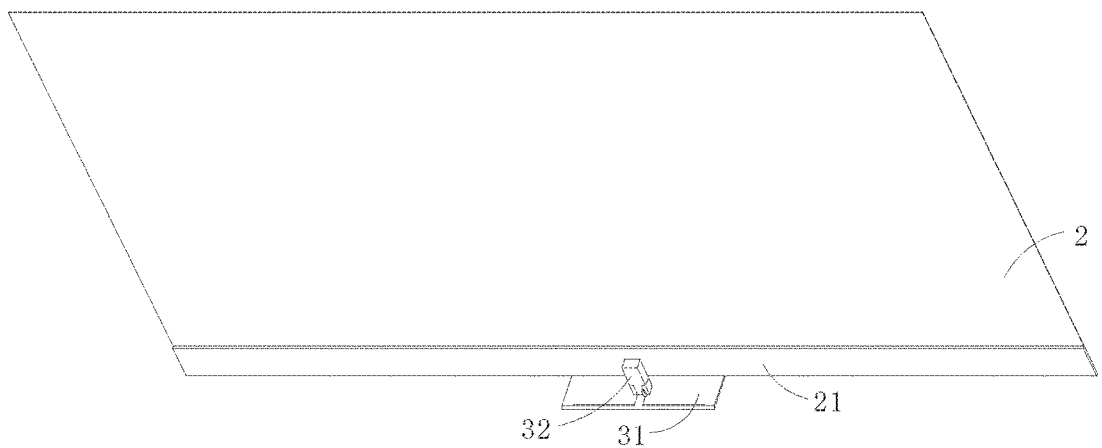
FIG. 1 is a diagram showing the effect of a display device according to an embodiment of the disclosure.
Figure 2:
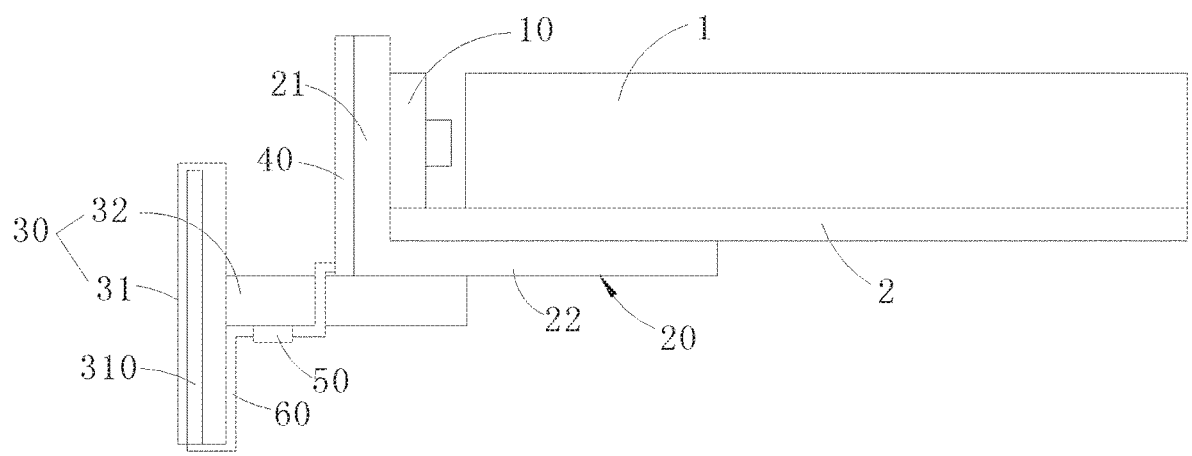
FIG. 2 is a structural schematic view of a display device according to an embodiment of the disclosure.

Referring to FIG. 1 and FIG. 2, a display device according to an embodiment of the disclosure mainly comprises a light guide plate 1, an LED light bar 10, a heat dissipation plate 20, a base 30, and a water cooling pipe 40. The LED light bar 10 is disposed at the light-incident end of the light guide plate 1. The light emitted by the LED light bar 10 enters in the light guide plate 1 from the side. The light is then evenly processed by the light guide plate 1 and emits from the top surface of the light guide plate 1 as a backlight source. The base 30, the heat dissipation plate 20, and the LED light bar 10 are all disposed at the side where the light-incident end of the light guide plate 1 is located. It should be understood that the display device further comprises a display panel, an optical film, and so on. In the embodiment, the structures of the display panel, the optical film and the like in the display device are not described in detail herein.

As shown in FIG. 2, the heat dissipation plate 20 is disposed beside the LED light bar 10. The LED light bar 10 is attached to the inner side of the heat dissipation plate 20 and faces the light incident end of the light guide plate 1. The base 30 is connected to the outer side of the heat dissipation plate 20 for supporting the display device. The water cooling pipe 40 comprises an inlet port, an outlet port, and multiple connected bending segments between the inlet port and the outlet port. The bending segments are attached to the heat dissipation plate 20 for circulating coolant liquid. The coolant liquid flows into the inlet port and then flows out of the outlet port to take away heat on the heat dissipation plate 20.

The heat dissipation plate 20 is an L-shaped aluminum extrusion. The heat dissipation plate 20 comprises a transverse plate 21 and a longitudinal plate 22 bent with each other. The LED light bar 10 is attached to the inner surface of the transverse plate 21. The longitudinal plate 22 is disposed opposite to the back surface of the light guide plate 1. The base 30 is made of a material with good thermal conductivity, such as metal. The base 30 comprises a bottom plate 31 and a supporting plate 32 which are disposed at an angle. The supporting plate 32 is attached to the surface of the longitudinal plate 22 facing away from the light guide plate 1. There may be a layer of backplane 2 between the longitudinal plate 22 and the light guide plate 1. The backplane 2 serves as one of the carrying structures of the light guide plate 1 and provides a certain back support force for the backplane 1. When the display device is in use, the heat dissipation plate 20 is located on the base 30 as a carrier and a back frame of the display device.

Here, the transverse plate 21 and the longitudinal plate 22 of the heat dissipation plate 20 are perpendicular to each other. The bottom plate 31 and the supporting plate 32 of the base 30 are perpendicular to each other. The supporting plate 32 is located at the middle portion of the bottom plate 31. The water cooling pipe 40 is a tortuously curved pipe structure. The entire surface of the water cooling pipe 40 is attached to the outer surface of the transverse plate 21 so as to better conduct the heat on the transverse plate 21.

Figure 3:
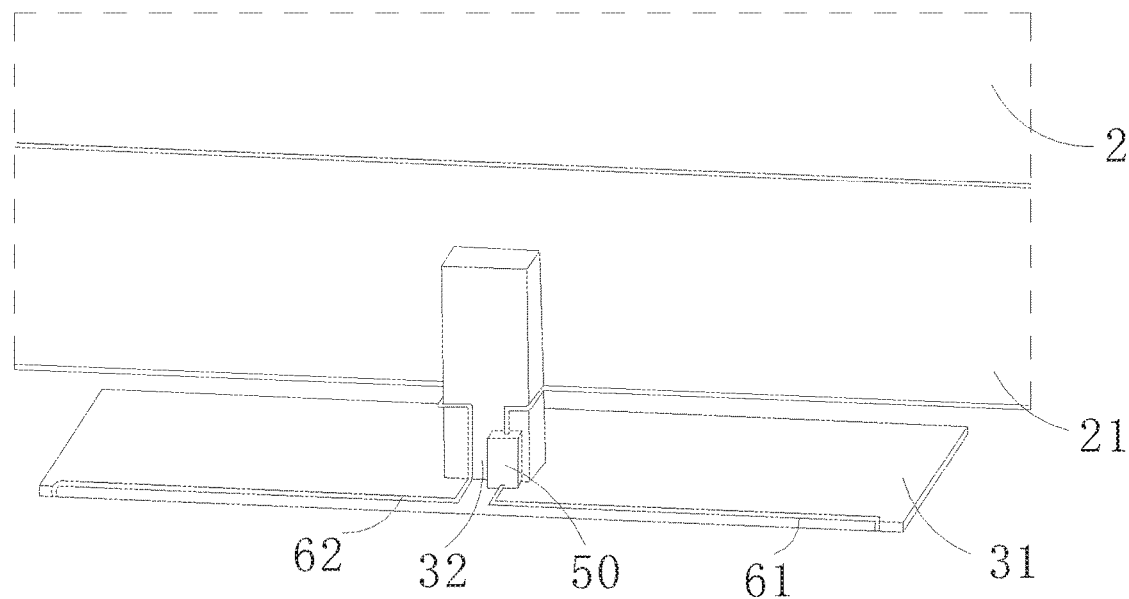
FIG. 3 is a partial structural schematic view of a back surface of a display device according to an embodiment of the disclosure.

As shown in FIG. 3, the inlet port and the outlet port of the water cooling pipe 40 are separately connected to the conduit 60. The conduit 60 extends along the supporting plate 32 to the side where the bottom plate 31 is located. Specifically, the conduit 60 comprises a liquid inlet pipe 61 connected to the inlet port and a liquid outlet pipe 62 connected to the outlet port. A water pump 50 for supplying the coolant liquid with power is connected to the middle portion of the liquid inlet pipe 61. The liquid inlet pipe 61 and the liquid outlet pipe 62 separately extend to be in contact with the surface of the bottom plate 31 so that the heat emitted from the LED light bar 10 is conducted to the bottom plate 31 and then distributed to the outside environment.

Figure 4:
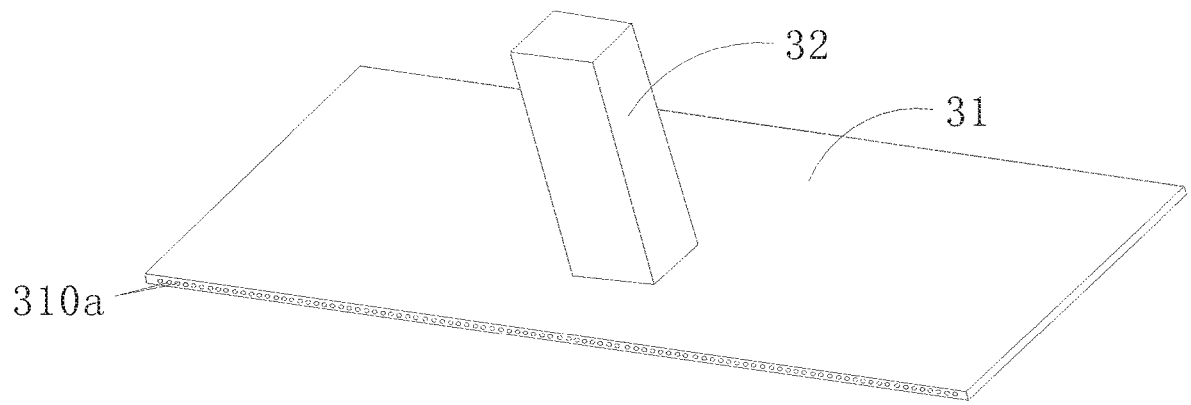
FIG. 4 is a structural schematic view of a base of a display device according to an embodiment of the disclosure.
Figure 5:
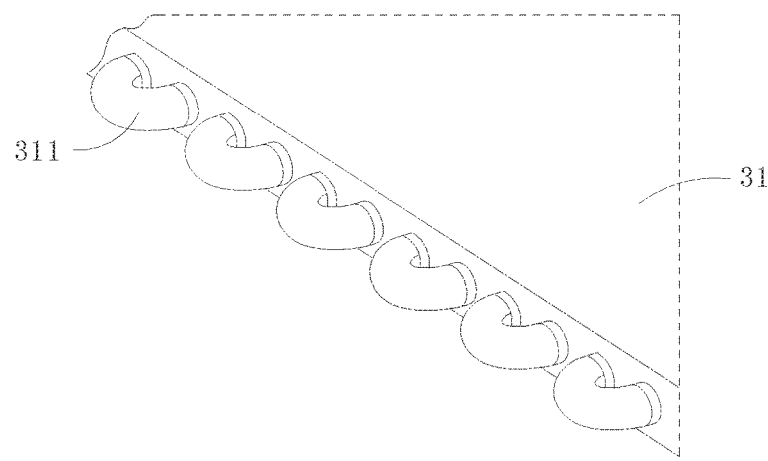
FIG. 5 is a partial structural schematic view of a base of a display device according to an embodiment of the disclosure.

As shown in FIG. 4 and FIG. 5, as one implementation way, the bottom plate 31 comprises a heat dissipation channel 310 disposed therein. The heat dissipation channel 310 is tortuously arranged and simultaneously connected to the liquid inlet pipe 61 and the liquid outlet pipe 62. The heat dissipation channel 310 comprises multiple second curved grooves 310a and linking pipes 311. The second curved grooves 310a are disposed in the bottom plate 31 and disconnected to each other. The linking pipes 311 are disposed outside of the bottom plate 31 and separately connect each two adjacent second curved grooves 310a. The liquid inlet pipe 61 and the liquid outlet pipe 62 separately extend from the middle portion of the bottom plate 31 towards two ends of the bottom plate 31, and then are connected to the heat dissipation channel 310.

Each of the second curved grooves 310a has a U-shape. The second curved grooves 310a extend along the width of the bottom plate 31. All the second curved grooves 310a are sequentially arranged along the length of the bottom plate 31. The ends of each of the second curved grooves 310a are separately connected to one end of the adjacent second curved grooves 310a through the U-shaped linking pipes 311. As a result, a complete heat dissipation channel 310 is formed. At the end, two ends of the heat dissipation channel 310 are individually located at two ends of the length of the bottom plate 31, and then separately connected to the liquid inlet pipe 61 and the liquid outlet pipe 62. As a result, a complete heat dissipation loop, which is the water cooling pipe 40—the water pump 50—the liquid inlet pipe 61—the heat dissipation channel 310—the liquid outlet pipe 62—the water cooling pipe 40, is formed. During the operation of the water pump 50, the coolant liquid is fed into the water cooling pipe 40 through the liquid inlet pipe 61. The coolant liquid in the water cooling pipe 40 is bent and zigzagged multiple times on the back of the transverse plate 21. As a result, the coolant liquid takes away the heat, which is emitted from the LED light bar 10 and transmitted to the heat dissipation plate 20. Afterwards, the coolant liquid flows from the liquid outlet pipe 62 through the curved heat dissipation channel 310 in the bottom plate 31. As a result, the heat is dissipated out from the bottom plate 31. The cooled coolant liquid is fed again by the water pump 50 from the liquid inlet pipe 61 into the water cooling pipe 40. Such cycle is repeated one or more times to complete the heat dissipation process of the display device.

Figure 6:
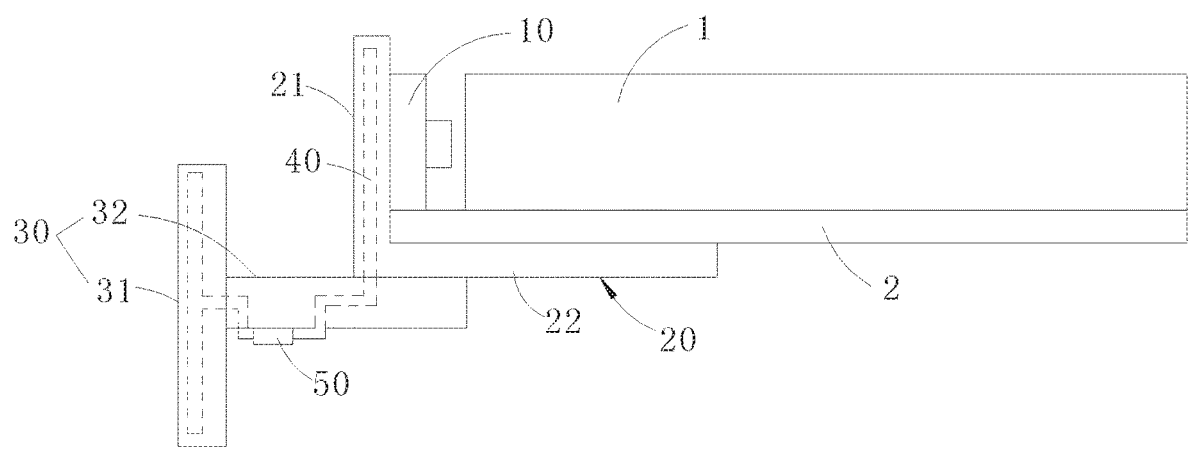
FIG. 6 is a partial structural schematic view of a base of a display device according to another embodiment of the disclosure.

As shown in FIG. 6, as another implementation way, the inlet port and the outlet port of the water cooling pipe 40 in the embodiment can both be disposed on the side where the supporting plate 32 is located. The transverse plate 21 comprises first curved grooves tortuously disposed therein. The inlet port and the outlet port of the water cooling pipe 40 are separately inserted into two ends of the first curved grooves. The liquid inlet pipe 61 and the liquid outlet pipe 62 are both disposed to penetrate the supporting plate 32. Only the water pump 50 is fixed on the back surface of the supporting plate 32. The liquid outlet pipe 62 led out from the bottom of the water pump 50 penetrates through the supporting plate 32 again. Therefore, the supporting plate 32 can also serve as a medium for heat dissipation.

In summary, the disclosure provides a novel liquid-cooling heat dissipation structure of a display device. By making full use of the heat dissipation capacity of the heat dissipation plate and the heat conduction base, the area of the heat dissipation plate is reduced and heat dissipation fins are avoided. Under the premise of ensuring the lightness and thinness of the display device, the display device has a good heat dissipation effect. The base of the display device also serves as a part of the heat dissipation element at the same time. Therefore, the cost of the liquid-cooling structure is reduced and the competitiveness of the product is enhanced.

The foregoing descriptions are merely specific implementation ways of the disclosure. It should be noted that those skilled in the art may make some improvements and modifications without departing from the principle of the disclosure. These improvements and modifications should also be included in the protection scope of the application.

What is claimed is:

1. A light and thin display device, comprising:
    a light guide plate for guiding a light;
    a light-emitting diode (LED) light bar disposed at a light-incident end of the light guide plate for emitting the light toward the light guide plate;
    a heat dissipation plate disposed beside the LED light bar, wherein the LED light bar is attached to an inner side of the heat dissipation plate;
    a base connected with an outer side of the heat dissipation plate for supporting the display device; and
    a water cooling pipe comprising an inlet port, an outlet port, and multiple bending segments connected between the inlet port and the outlet port, wherein the bending segments are attached to the heat dissipation plate for circulating a coolant liquid, and wherein the coolant liquid flows into the inlet port and then flows out of the outlet port to take away heat on the heat dissipation plate,
    wherein the heat dissipation plate is an L-shaped aluminum extrusion and comprises a transverse plate and a longitudinal plate which are bent with each other,
    wherein the LED light bar is attached to an inner surface of the transverse plate, and the longitudinal plate is disposed opposite to a back surface of the light guide plate,
    wherein the base comprises a bottom plate and a supporting plate which are disposed at an angle, and wherein the supporting plate is attached to a surface of the longitudinal plate facing away from the light guide plate.

2. The light and thin display device as claimed in claim 1, wherein the water cooling pipe is attached to an outer surface of the transverse plate.

3. The light and thin display device as claimed in claim 1, wherein the transverse plate comprises a first curved groove disposed therein, and wherein the inlet port and the outlet port of the water cooling pipe are separately inserted into two ends of the first curved groove.

4. The light and thin display device as claimed in claim 1, further comprising a water pump and a conduit connected to each other, wherein the water pump is used for supplying power to the coolant liquid, and the conduit comprises a liquid inlet pipe connected to the inlet port and a liquid outlet pipe connected to the outlet port, and wherein the liquid inlet pipe and the liquid outlet pipe separately extend to be in contact with a surface of the bottom plate.

5. The light and thin display device as claimed in claim 4, wherein the bottom plate comprises a heat dissipation channel disposed therein, and wherein the heat dissipation channel is tortuously arranged and simultaneously connected to the liquid inlet pipe and the liquid outlet pipe.

6. The light and thin display device as claimed in claim 5, wherein the heat dissipation channel comprises:
    multiple second curved grooves disposed in the bottom plate and disconnected to each other; and
    linking pipes disposed outside of the bottom plate and separately connecting each two of the second curved grooves adjacent to each other.

7. The light and thin display device as claimed in claim 5, wherein the liquid inlet pipe and the liquid outlet pipe separately extend from a middle portion of the bottom plate to two ends of the bottom plate and are connected to the heat dissipation channel.

8. The light and thin display device as claimed in claim 4, wherein the liquid inlet pipe and the liquid outlet pipe are disposed to penetrate the supporting plate.

9. The light and thin display device as claimed in claim 2, further comprising a water pump and a conduit connected to each other, wherein the water pump is used for supplying power to the coolant liquid, and the conduit comprises a liquid inlet pipe connected to the inlet port and a liquid outlet pipe connected to the outlet port, and wherein the liquid inlet pipe and the liquid outlet pipe separately extend to be in contact with a surface of the bottom plate.

10. The light and thin display device as claimed in claim 9, wherein the bottom plate comprises a heat dissipation channel disposed therein, and wherein the heat dissipation channel is tortuously arranged and simultaneously connected to the liquid inlet pipe and the liquid outlet pipe.

11. The light and thin display device as claimed in claim 10, wherein the heat dissipation channel comprises:
    multiple second curved grooves disposed in the bottom plate and disconnected to each other; and
    linking pipes disposed outside of the bottom plate and separately connecting each two of the second curved grooves adjacent to each other.

12. The light and thin display device as claimed in claim 10, wherein the liquid inlet pipe and the liquid outlet pipe separately extend from a middle portion of the bottom plate to two ends of the bottom plate and are connected to the heat dissipation channel.

13. The light and thin display device as claimed in claim 9, wherein the liquid inlet pipe and the liquid outlet pipe are disposed to penetrate the supporting plate.

14. The light and thin display device as claimed in claim 3, further comprising a water pump and a conduit connected to each other, wherein the water pump is used for supplying power to the coolant liquid, and the conduit comprises a liquid inlet pipe connected to the inlet port and a liquid outlet pipe connected to the outlet port, and wherein the liquid inlet pipe and the liquid outlet pipe separately extend to be in contact with a surface of the bottom plate.

15. The light and thin display device as claimed in claim 14, wherein the bottom plate comprises a heat dissipation channel disposed therein, and wherein the heat dissipation channel is tortuously arranged and simultaneously connected to the liquid inlet pipe and the liquid outlet pipe.

16. The light and thin display device as claimed in claim 15, wherein the heat dissipation channel comprises:
   multiple second curved grooves disposed in the bottom plate and disconnected to each other; and
   linking pipes disposed outside of the bottom plate and separately connecting each two of the second curved grooves adjacent to each other.

17. The light and thin display device as claimed in claim 15, wherein the liquid inlet pipe and the liquid outlet pipe separately extend from a middle portion of the bottom plate to two ends of the bottom plate and are connected to the heat dissipation channel.

18. The light and thin display device as claimed in claim 14, wherein the liquid inlet pipe and the liquid outlet pipe are disposed to penetrate the supporting plate.

* * * * *